June 29, 1926.
B. J. KLINKOSH
FLUID COUPLING
Filed May 8, 1925
1,590,465
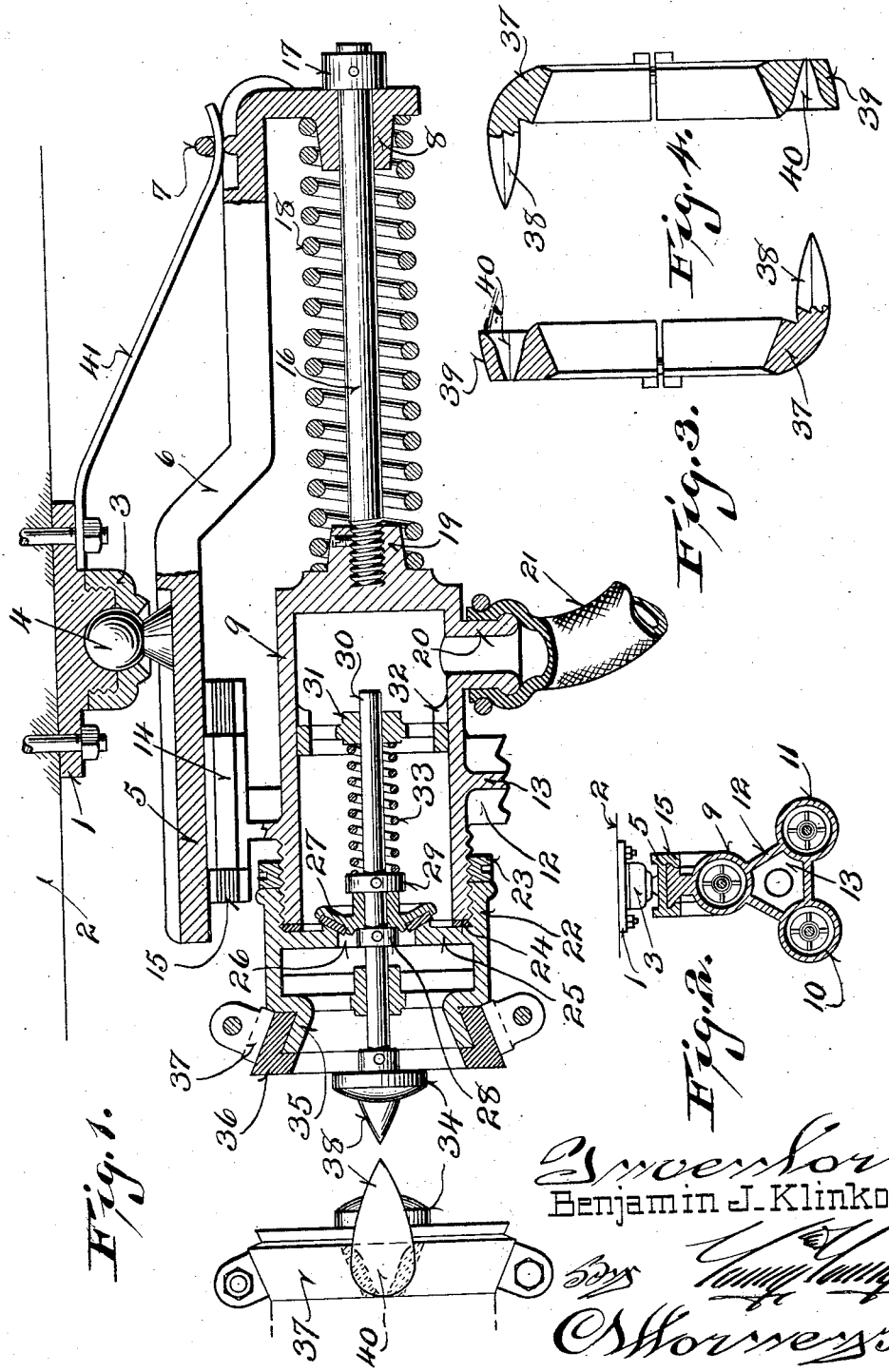
Inventor
Benjamin J. Klinkosh Patented June 29, 1926.

1,590,465

UNITED STATES PATENT OFFICE.

BENJAMIN J. KLINKOSH, OF MILWAUKEE, WISCONSIN.

FLUID COUPLING.

Application filed May 8, 1925. Serial No. 28,830.

This invention relates to fluid couplings, and is particularly directed to a fluid coupling for railway cars.

Objects of this invention are to provide a fluid coupling which is adapted to be carried adjacent the ends of railway cars and to automatically couple the air pipes and the steam pipes or other suitable pipes of railway cars whenever the cars are mechanically coupled together without requiring a definite manual coupling of the parts as is now the practice.

Further objects are to provide a coupling which may be used to couple one or a plurality of pipes in a simple and efficacious manner, which will adapt itself to variations in alignment of the cars, but which will automatically and correctly align itself with the adjacent fluid coupling when the cars are brought together to insure a correct sealing of the joint by the successive couplings.

An embodiment of the invention is shown in the accompanying drawings, in which:—

Figure 1 is a longitudinal sectional view through a portion of the coupling showing its relative position to the car and to the face of the adjacent coupling.

Figure 2 is a transverse view through the entire coupling, such view being drawn to a smaller scale.

Figures 3 and 4 show the aligning members of adjacent couplings.

Referring to Figure 1, it will be seen that a bracket 1 is securely bolted to the under side of the railway car 2. This bracket carries a cap 3 which is screwed thereon and which houses the ball 4 of a universal joint, This ball is integrally or rigidly formed with a guide 5.

It is to be noted that this guide extends downwardly, as indicated at 6, and is provided with an eyelet portion 7 and with an apertured hub 8.

The body portion of the coupling comprises a plurality of cylinders 9, 10, and 11, as most clearly shown in Figure 2, which are joined by integral arms 12 and a reenforcing web 13. The uppermost of the cylinders, for instance, the cylinder 9, is shown in considerable detail in Figure 1, and it will be seen from reference to Figures 1 and 2, that this uppermost cylinder of the body portion carries an integrally formed slide 14 which is dovetailed into the guiding portions 15 of the guide 5. It is to be noted that the slide 14 is relatively elongated so as to afford a substantial sliding support for the main body portion of the coupling. The alignment of the coupling with the guide 5 is maintained by means of a rod 16 screwed into the end of the cylinder 9, as shown in Figure 1, and loosely passing through the hub 8 of the guide 5. This guide 5, it will be noted is in the form of a yoke for suspending the entire device from the universal joint.

It is to be noted that the rod 16 has a collar 17 rigidly secured thereto which is adapted to abut the rear face of the hub 8 and thus limit the forward motion of the device. A relatively heavy helical spring 18 is seated upon the hub 8 and upon the extension 19 of the cylinder 9, thus tending to maintain the body portion of the coupling in its extreme forward position.

Each of the cylinders 9, 10 and 11, is similar in construction, and therefore, a description of the cylinder 9 will suffice. This cylinder is provided with an inlet portion 20 which receives the air or steam hose 21. It is externally threaded at its open end and receives the head 22 which is screwed thereon and locked in position by means of the ring nut 23, a suitable gasket being provided as indicated at 24 between the web 25 of the head and the end of the cylinder. This web 25 is provided with an aperture 26 surrounded by beveled faces on its rear side. These beveled faces constitute a valve seat and are adapted to cooperate with a valve 27, such valve being provided with an annular gasket or sealing strip, as shown, if desired. It is preferable to carry this valve 27 between collars 28 and 29 rigidly secured to the valve rod 30. Further, it will be noted that the rear end of the valve rod is guided by means of a spider 31 through which it loosely passes, such spider being held against stops 32 formed in the cylinder, and such valve being held against its valve seat by means of the helical spring 33. It is to be noted that the spring 33 is materially lighter than the spring 18 and consequently pressure against the valve rod will unseat the valve 27 without, however, moving the cylinder rearwardly.

The forward end of the valve rod carries a bumper head 34 adapted to contact with a similar head formed on the adjacent coupling member. The main head 22 of the coupling is provided with an outwardly flared end 35 which is surrounded by a rubber or similar gasket 36. This gasket or sealing ring extends downwardly against the front of the head a slight distance, as shown in Figure 1, and is held in position by means of split clamping rings 37. These clamping rings are most clearly illustrated in Figures 3 and 4, which show the relative position of adjacent rings and correspond to a horizontal sectional view through the rings. The rings are each provided with a projecting tapered tongue 38 and with an enlargement 39 diametrically opposed to the tongue. This enlargement is provided with a tapered aperture 40 adapted to receive and guide the tapered tongue 38 of the adjacent ring.

In order to yieldingly maintain the coupling member in axial alignment with the car body 2, a leaf spring 41 is bolted to the bracket 1, as shown in Figure 1, and its rear end is passed through the eyelet portion 7 of the yoke 5. Thus the leaf spring yieldingly maintains the parts in proper position while permitting resiliently resisted motion of the body portion of the coupling with reference to the car body.

The operation of the device will be readily understood from the description and drawings. For example when the cars are to be coupled in the usual manner, the sealing rings 36 are brought into contact with each other. However, the aligning tongues 38 enter the tapered apertures 40 and insure correct alignment of the adjacent ends of the couplings. It is to be understood distinctly that any suitable aligning means may be provided and, for example, the apertures 40 and the tapered tongues 38 may be as large or extensive as desired. This aligning of the coupling members is automatic. When the cars are brought together into their normal coupled relation the sealing rings 36 are in intimate contact with each other and the springs 18 are compressed, the body portion of the coupling members being slid inwardly in each case. In addition to this the bumper heads 34 of the adjacent coupling members contact and thus unseat the valves 27 and thus put the fluid pipes, such as the pipes 21, in communication from one car to the next car. Obviously, separation of the cars results in immediate sealing of the coupling members as the valves 27 are pressed into engagement with their seats and the apertures 26 are instantly closed.

It will be seen, therefore, that a very effective type of fluid coupling has been provided which is of practical and serviceable construction, which will automatically couple any number of fluid pipes carried by railway cars whenever the cars are mechanically coupled together, and which will immediately seal the pipes whenever the cars are separated.

Although the invention has been described in considerable detail, it is to be understood that the invention may be variously embodied and is, therefore, to be limited only as claimed.

I claim:

A fluid coupling comprising a supporting guide, a hollow body portion carried thereby, a spring urging said body portion outwardly, said body portion having an opening in its outer end surrounded by a sealing ring, a valve controlling communication between the interior of said hollow body portion and its open end and having a bumper head projecting outwardly for opening said valve, a spring urging said valve towards closed position, said last mentioned spring being lighter than said first mentioned spring, a split collar surrounding and clamping said sealing ring to the outer end of the body portion, said split collar having an outwardly projecting tapered aligning pin and having a tapered aperture formed at a point diametrically opposite said pin.

In testimony that I claim the foregoing I have hereunto set my hand at Milwaukee, in the county of Milwaukee and State of Wisconsin.

BENJAMIN J. KLINKOSH.